United States Patent [19]

Madni et al.

[11] Patent Number: 5,753,828
[45] Date of Patent: May 19, 1998

[54] SHAFT TORQUE MEASURING SYSTEM

[75] Inventors: Asad M. Madni, Los Angeles; Lawrence A. Wan, Malibu; Robert K. Hansen, Burbank, all of Calif.

[73] Assignee: EI Sensors & Systems Company, Inc., Sylmar, Calif.

[21] Appl. No.: 825,539

[22] Filed: Mar. 31, 1997

Related U.S. Application Data

[63] Continuation of Ser. No. 665,745, Jun. 18, 1996, abandoned.

[51] Int. Cl.[6] ........................................... G01L 3/10
[52] U.S. Cl. .............................. 73/862.338; 73/862.325
[58] Field of Search ........................ 73/862.191, 862.321, 73/862.322, 862.338

[56] References Cited

U.S. PATENT DOCUMENTS

| | | | |
|---|---|---|---|
| 2,392,293 | 1/1946 | Ruge | 73/862.338 |
| 2,403,952 | 7/1946 | Ruge | 73/862.338 |
| 2,423,620 | 7/1947 | Ruge | 73/862.338 |
| 2,563,425 | 8/1951 | Schaevitz | 73/862.338 |
| 2,566,566 | 9/1951 | Howes | 73/862.338 |
| 3,128,622 | 4/1964 | Lebow | 73/862.338 |
| 3,800,591 | 4/1974 | Tveter | 73/862.321 |
| 4,096,743 | 6/1978 | Diamond . | |
| 5,195,383 | 3/1993 | Tanaka . | |
| 5,445,036 | 8/1995 | Hordnes et al. | 73/862.322 |
| 5,585,572 | 12/1996 | Kindler | 73/862.338 |

*Primary Examiner*—Ronald L. Biegel
*Attorney, Agent, or Firm*—Flehr Hohbach Test Albritton & Herbert

[57] ABSTRACT

A shaft torque measuring device in the form of a compact sleeve may be slid on the steering shaft of an automobile and requires only about the same axial space as the diameter of the shaft itself. Two collars are integrally interconnected by four cross members, some of which carry strain gauges. Frictional force maintains the collars in place with torque applied to the steering shaft thus causing the cross member to bend. This deformation is sensed by the strain gauge bridge to produce a torque measurement.

6 Claims, 3 Drawing Sheets

SHAFT TORQUE MEASURING SYSTEM

This is a continuation of application Ser. No. 08/665,745, filed Jun. 18, 1996, now abandoned.

The present invention is directed to a shaft torque measuring system and more particularly to a shaft that is connected to a steering wheel of an automotive product.

BACKGROUND OF THE INVENTION

Devices for detecting torque caused by turning of a steering wheel are illustrated in Tanaka U.S. Pat. No. 5,195,383. Here the torque sensing device is connected directly to the steering wheel and then the steering shaft. In modern day cars, this is impractical since a steering column must accommodate multiple control functions. This includes radio and air conditioning, signal lights and headlights, heating, and cruise control, etc. Thus, space is at a premium in the steering column. One other known steering torque detecting device to minimize space even cuts the steering shaft and places a torque sensing device in the cut. This is, of course, undesirable both from manufacturing cost and safety standpoints. Other torque measurement systems are known such as disclosed in Diamond U.S. Pat. No. 4,096,073 but are used for rotatable shafts, for example, to measure the horse power output. Here space is not at any premium and therefore the installation is much simpler.

OBJECT AND SUMMARY OF THE INVENTION

It is an object of the invention to provide a shaft torque measuring system which is compact and simple to install.

In accordance with the above object there is provided a measuring system for determining the torque of a shaft rotatable around an axis by a steering wheel of an automotive product comprising a unitary sleeve frictionally retained on the shaft including a pair of closely spaced collars, relative to the diameter of the shaft, the collars each having an outer diameter and an inner diameter, connected by at least a pair of similar elongated cross members rigidly extending from each collar, each of the cross member having a flat surface. Each of the collars has a radial slice from the outer diameter to the inner diameter to provide a spring effect to allow the sleeve to be slid on the shaft and to provide sufficient friction force between the inner diameter of the collars and the shaft to maintain a fixed position of each collar on the contiguous portion of the shaft when torque is applied and to allow the cross members to bend and thereby to deform their flat surfaces. Strain gauge means mounted on at least one of the flat surfaces sense this deformation and measure the torque.

DETAILED DESCRIPTION OF PREFERRED EMBODIMENT

Figure 1:
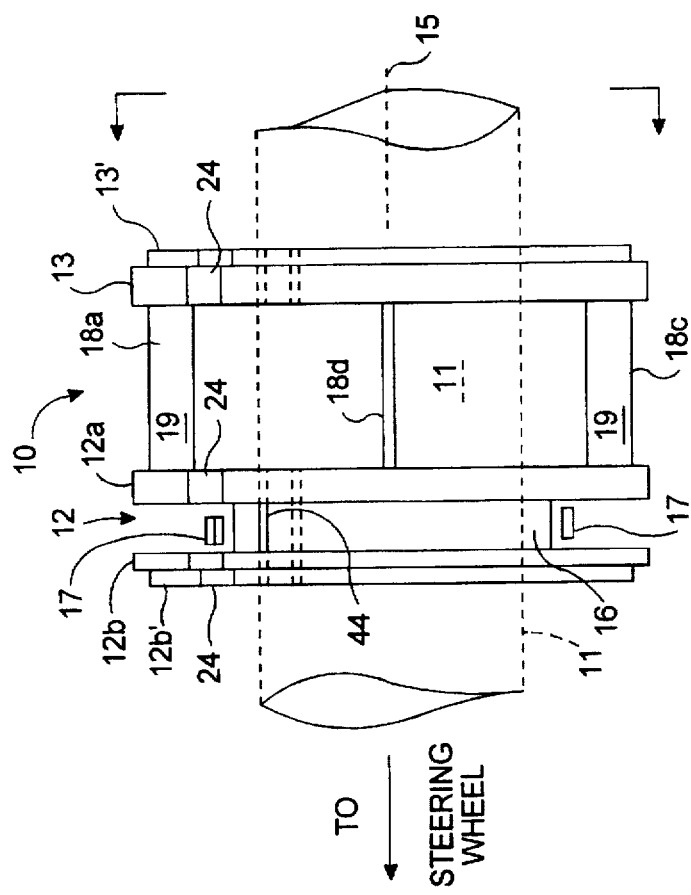
FIG. 1 is a side elevational view of a system embodying the present invention showing how it would be installed on the shaft of a steering column.

FIG. 1 illustrates a mechanical portion of the invention which includes the sleeve 10 which is slipped over the shaft 11 of, for example, the steering column of an automobile (shown in dashed outline) and retained there by friction to sense the torque in the shaft 11 caused by the rotation of an associated steering wheel. As will be discussed below, sleeve 10 is frictionally retained on the shaft. It includes a pair of closely spaced collars 12 and 13 which are similar in construction except that the collar 12 has a main portion 12a and a subsidiary portion 12b connected together by an intermediate hub 16 around which a flexible cable harness or flex circuit 17 may be wrapped to accommodate multiple turns of the shaft 11. Typically, for an automobile steering wheel and shaft this is plus or minus two and a half turns from center. Such spring loaded cable harness may be purchased under the trademark "Wire Flex". For a greater number of turns (or continuous rotation, if desired) slip rings might be used. But "Wire Flex" is preferred, especially for the limited space in a steering column.

Both collars 12b and 13 have on their exterior sides recessed or indented portions 13' and 12b which will accommodate a plastic cover to seal off the sleeve unit 10 from the ambient conditions of the automobile or truck. Collars 12a and 13 are rigidly interconnected by four elongated cross members 18a–18d (see FIG. 2). They are similar in construction and rigidly extend from one to the other collar; in fact, in the embodiment shown in FIG. 1, sleeve 10 consists of a unitary machined piece of metal. Alternatively, depending on use, of course, it may be possible, for example, to connect the cross members 18a–18d to their respective collars by brazing, etc. as long as a rigid enough connection is provided to transmit a bending force when one collar is rotationally shifted from the other collar by twisting of shaft 11. In any case each cross member has a flat surface 19 on which may be mounted as shown in FIG. 3A, a strain gauge bridge 21. As more fully shown in FIG. 3B at least one bridge 21 is connected by the flex circuit 17 to a remote torque processing unit 22 via a pre-conditioner 41 (mounted in collar 10), a final conditioning unit 42, and a connector 43. It is also possible, of course, to mount a portion of the processing unit in the open space between one of the cross members; for example, 18a and the shaft 11.

Figure 2:
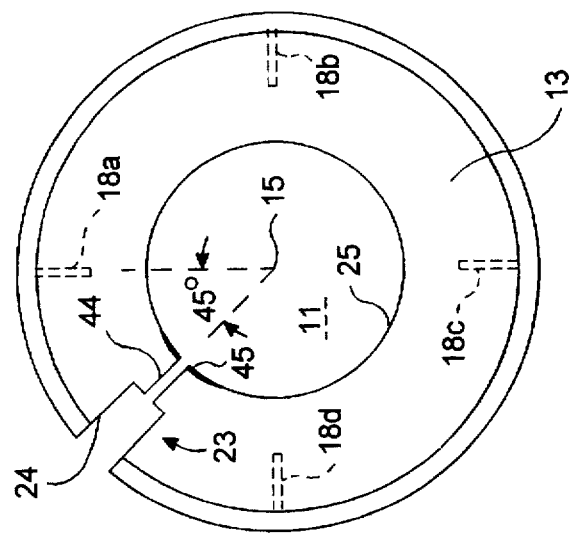
FIG. 2 is an end view taken along the line 2—2 of FIG. 1.
Figure 3A:
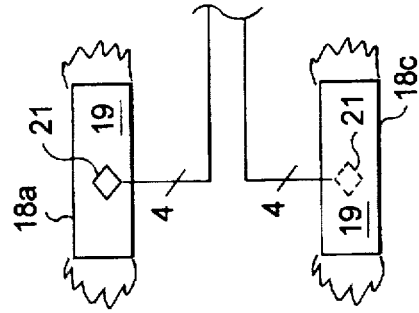
FIG. 3A is a schematic block diagram illustrating a portion of the circuitry necessary to determine torque.
Figure 3B:
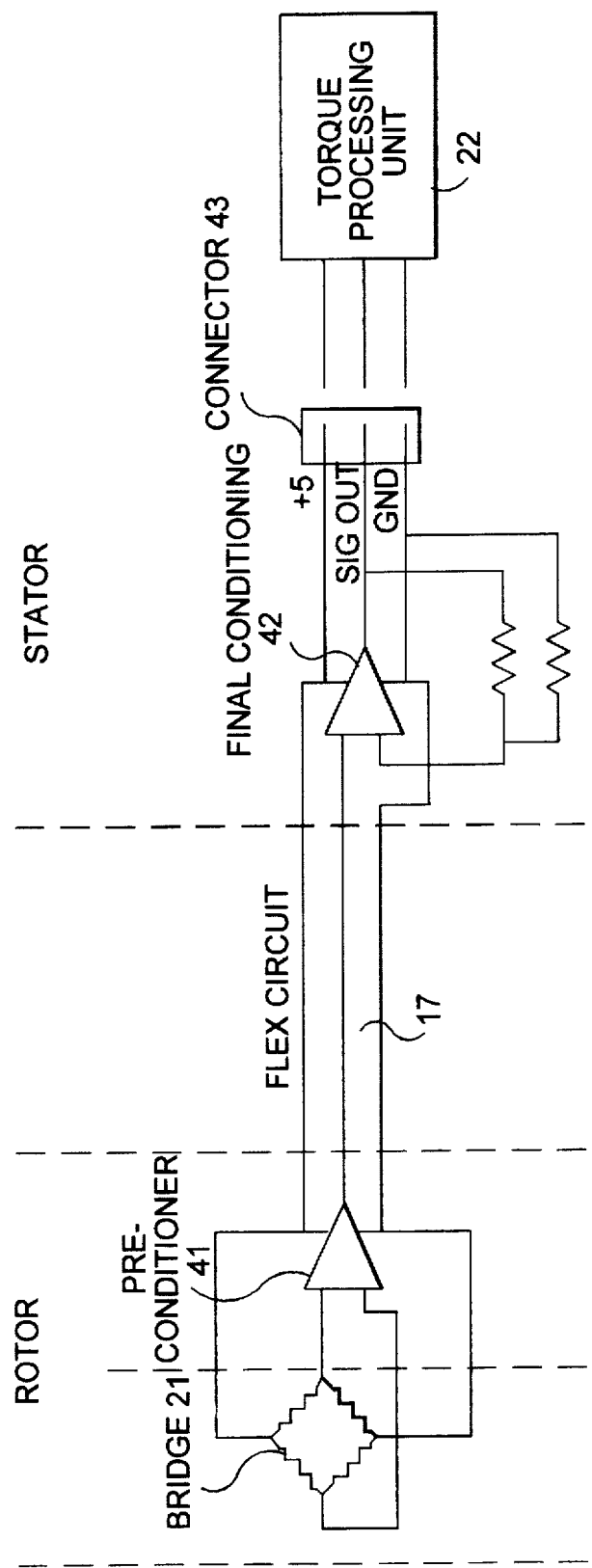
FIG. 3B is a schematic block diagram showing the remainder of the circuitry of FIG. 3A.

As best shown in FIG. 2 all of the collars 12 and 13 and the hub 16 have a radial slice 23 from their outer diameter to the inner diameter 25. This provides a spring effect to allow the sleeve 10 to be slid on the shaft 11 and to provide sufficient friction force between the inner diameter 25 of the sleeve and its associated collars and the contiguous or adjacent portion of the shaft 11 next to it. Thus when torque is applied, cross members 18a–18d bend to thereby deform flat surface 19 to indicate torque by using the strain gauges 21. The slice 23 has toward its outer diameter a larger radial slot 24 which during installation allows the collars to be wedged open by appropriate wedge or lever (not shown) and then slid on the shaft; then the wedge is removed or the lever released. A smaller slot 44 then continues to the inner diameter 25 which has a chamfered or bevel finish indicated at 45.

Figures 4, 5:
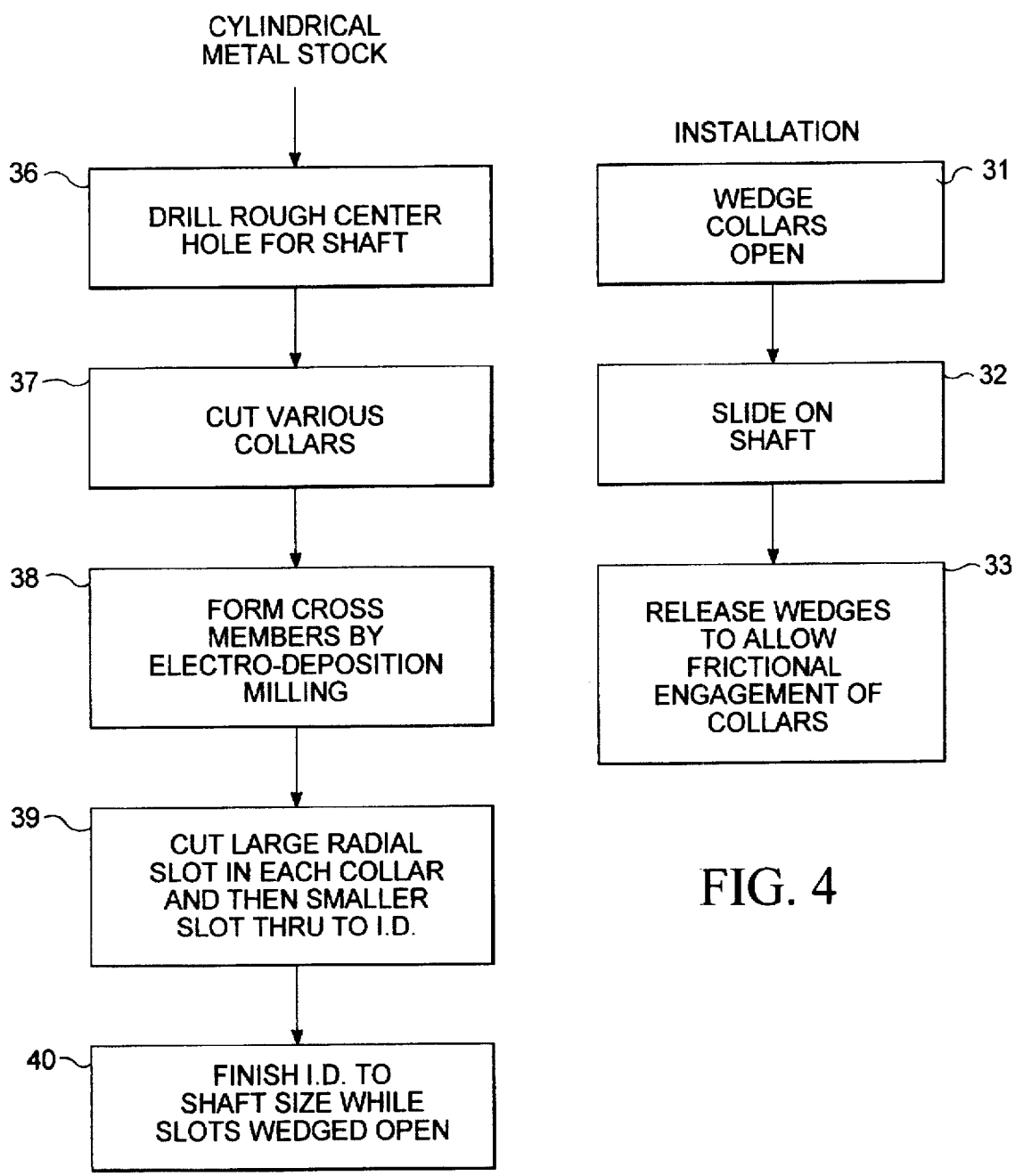
FIG. 4 is a flow chart showing an installation procedure.
FIG. 5 is a flow chart illustrating one technique of manufacture of a component of the present invention.

FIG. 4 illustrates this installation procedure where in step 31 the collars are wedged open and in step 32 sleeve 10 is slid on the shaft. Then in step 33 the wedges are removed, or lever released, to allow frictional engagement with the shaft 11. Although the term "wedge" is used, a type of lever or spring arrangement could equivalently be utilized for the same function for convenient use on, for example, an automobile assembly line. A so-called grenade pin release procedure might be used.

The flow chart or process steps of FIG. 5 illustrate the preferred technique of manufacturing sleeve 10 starting with a cylindrical metal stock in step 36 where a hole somewhat smaller than the diameter of shaft 11 (which in this case is typically ¾ of an inch is drilled through the center of the shaft. And then in step 37 the various collars are machined as illustrated in FIG. 1. In step 38 by the use of electrodeposition milling, the cross members 18a–18d are formed and the excess metal milled out. Next in step 39, a large radial slot 23 is cut in each collar and then the smaller portion of the slot or slice is cut through to the inner diameter. This includes the flexible wire hub 16. Finally in step 40 the inner diameter is finished to the exact shaft size while slots 24 are wedged open. This insures that the full spring effect of the sleeve 10 can be taken advantage of. The metal used is PH17-4 which is heat treated to Rc 38 to 45. This is a high performance stainless steel.

Because of space limitations in the steering column it is important that the collars 12 and 13 be closely spaced relative to the shaft 11 diameter so that as little space as possible is used. Thus as a practical matter with a diameter of about ¾ of an inch, the axial length of sleeve 10 is about 1 inch. Other dimensions in inches are:

Cross members 18a18d

L=0.475

W=0.150

T=0.030

Outer diameter of collars 12–13=1.5

Referring to FIG. 2, slot 24 is cut to 0.140 and the narrower slice or slot 44 is 0.01 to 0.03. The angle between the slot 24 and a line through cross member 18a is 45°.

In operation the cross members 18a–18d have their flat surfaces 19 deformed by bending while the friction force created by the collars 12 and 13 keeps them engaged with their contiguous portions of the shaft. Because of the construction and thickness of the cross members 18a–18d they also successfully form a unitary sleeve which is structurally strong enough and a durable enough for installation on an assembly line in an automobile plant but at the same time allow enough bending so that the associated strain gauges 21 may sense minor amounts of torque. The durability of the specific example of the invention has been tested; it has an effective measurement range of ±6 Newton-meters but yet will withstand an overload of 135 Newton-meters without change in calibration.. The frictional clamping force for each collar is typically about 50 pounds.

It is believed that for sufficient durability and resistance to overload that ideally four cross members 18a–18d are desirable. However, a minimum of two should be provided. With relation to the strain gages, as illustrated in FIG. 3A, two may be mounted as illustrated on relative opposite sides to compensate for bending; or alternatively, one half strain gauge may be mounted on one cross member and one half on the other. This can all be accommodated by the processing unit 22.

Thus an improved compact and durable shaft torque measuring device has been provided.

What is claimed is:

1. A measuring system for determining the torque of a continuous unbroken, unitary shaft rotatable around an axis by a steering wheel of an automotive product comprising:

a unitary one piece sleeve frictionally retained on the outer surface of said continuous unbroken, unitary shaft including a pair of closely spaced collars, relative to the diameter of said shaft, said collars each having an outer diameter and an inner diameter, connected by at least a pair of similar discrete elongated cross members rigidly extending from each collar, each said cross member having a flat surface, each of said collars having a radial slice from said outer diameter to said inner diameter to provide a spring effect to allow said sleeve to be slid on said shaft and to provide sufficient friction force between said inner diameter of said collars and said shaft to maintain a fixed position of each collar on the contiguous portion of the shaft when torque is applied, whereby said sleeve is frictionally retained on said continuous unbroken, unitary shaft and to allow said cross members to bend and thereby to deform their said first surfaces;

strain gauge means mounted on at least one of said flat surfaces to sense said deformation and measure said torque.

2. A measuring system as in claim 1 wherein said strain gauge means are mounted on a pair of said flat surfaces of said cross members on relatively opposite sides in order to compensate for bending of the axis of said shaft.

3. A measuring system as in claim 1 wherein said sleeve consists of a unitary piece of metal.

4. A measuring system as in claim 1 where said flat surfaces are substantially coincident with radial planes extending from said axis of said shaft.

5. A measuring device as in claim 1 where said strain gauge means are electrically connected to a torque processing unit by a flexible cable harness where one of said collars includes an intermediate hub around which said flexible cable harness may be wrapped to accommodate multiple turns of said shaft.

6. A method of measuring the torque of a continuous unbroken, unitary shaft rotatable around an axis by a steering wheel of an automotive product where a unitary one piece sleeve is frictionally retained on the outer surface of the continuous unbroken, unitary shaft, the sleeve including a pair of closely spaced collars, relative to the diameter of the shaft, the collars each having an outer diameter and an inner diameter, connected by at least a pair of similar discrete elongated cross members rigidly extending from each collar, each cross member having a flat surface, and where each of the collars has a radial slice from the outer diameter to the inner diameter to provide a spring effect to allow said sleeve to be slid on said shaft and to provide sufficient friction force between the inner diameter of the collars and the shaft to maintain a fixed position of each collar on the contiguous portion of the shaft when torque is applied, and where strain gauge means are mounted on at least one of the flat surfaces to sense the deformation and measure the torque includindg the step of installing the collars on the outer surface of said shaft by first wedging the collars open slightly, sliding the sleeve on the shaft and then removing the wedges to fix the collars and sleeve in a final position.

* * * * *

UNITED STATES PATENT AND TRADEMARK OFFICE
CERTIFICATE OF CORRECTION

PATENT NO. : 5,753,828
DATED : May 19, 1998
INVENTOR(S) : MADNI, et al.

It is certified that error appears in the above-indentified patent and that said Letters Patent is hereby corrected as shown below:

On the cover page, after "[73] Assignee:" please delete "EI Sensors & Systems Company, Inc., Sylmar, Calif." and insert therefor --BEI Sensors & Systems Company, Inc., Sylmar, Calif.--

Signed and Sealed this

Eighteenth Day of August, 1998

Attest:

BRUCE LEHMAN

Attesting Officer

Commissioner of Patents and Trademarks